US010195972B2

(12) United States Patent
Samain et al.

(10) Patent No.: US 10,195,972 B2
(45) Date of Patent: Feb. 5, 2019

(54) METHOD OF PRODUCING A LUMBAR SUPPORT DEVICE, LUMBAR SUPPORT DEVICE AND VEHICLE SEAT

(71) Applicant: SCHUKRA GERÄTEBAU GMBH, Berndorf (AT)

(72) Inventors: Maxime Samain, Nürnberg (DE); Christoph Kiesewetter, Pommelsbrunn (DE); Andreas Weinmüller, Baden (AT); Robert Kremen, Traun (AT); Freddy Vallant

( * ) Notice: Subject to any disclaimer, the term of this patent is extended or adjusted under 35 U.S.C. 154(b) by 44 days.

(21) Appl. No.: 15/308,020

(22) PCT Filed: Apr. 23, 2015

(86) PCT No.: PCT/EP2015/058791
§ 371 (c)(1),
(2) Date: Oct. 31, 2016

(87) PCT Pub. No.: WO2015/165793
PCT Pub. Date: Nov. 5, 2015

(65) Prior Publication Data
US 2017/0050549 A1   Feb. 23, 2017

(30) Foreign Application Priority Data

May 2, 2014   (EP) ..................................... 14166938

(51) Int. Cl.
*B60N 2/66*   (2006.01)
*A47C 7/46*   (2006.01)
(Continued)

(52) U.S. Cl.
CPC .................. *B60N 2/66* (2013.01); *A47C 7/46* (2013.01); *B29C 45/14549* (2013.01);
(Continued)

(58) Field of Classification Search
CPC ...... B60N 2/66; B60N 2/6671; B60N 2/6673; B60N 2/667; A47C 7/46; B29C 45/14549;
(Continued)

(56) References Cited

U.S. PATENT DOCUMENTS 5,217,278 A * 6/1993 Harrison ............... B60N 2/0296
192/48.91
6,652,028 B2 * 11/2003 McMillen ............. B60N 2/0228
297/284.4
(Continued)

FOREIGN PATENT DOCUMENTS

CN   101676146   3/2010
CN   102452344   5/2012
(Continued)

OTHER PUBLICATIONS

International Search Report and Written Opinion for Application No. PCT/EP2015/058791 dated Jun. 25, 2015 (10 pages).
(Continued)

*Primary Examiner* — Mark R Wendell
(74) *Attorney, Agent, or Firm* — Michael Best & Friedrich LLP (57) ABSTRACT

A lumbar support device comprises a carrier, a pair of arching elements molded to the carrier, and a support basket supported by the pair of arching elements. To produce the lumbar support device, the pair of arching elements may be molded to the carrier in a molding tool and the support basket may be formed in the same molding tool.

13 Claims, 10 Drawing Sheets (51) Int. Cl.
  *B29C 45/14* (2006.01)
  *B29C 45/26* (2006.01)
  *B29K 705/00* (2006.01)
  *B29L 31/00* (2006.01)

(52) U.S. Cl.
  CPC .... *B29C 45/14754* (2013.01); *B29C 45/2673* (2013.01); *B60N 2/6671* (2015.04); *B60N 2/6673* (2015.04); *B29K 2705/00* (2013.01); *B29L 2031/771* (2013.01)

(58) Field of Classification Search
  CPC .......... B29C 45/14754; B29C 45/2673; B29K 2705/00
  USPC ...................................................... 297/284.4
  See application file for complete search history.

(56) References Cited

U.S. PATENT DOCUMENTS

| | | | | |
|---|---|---|---|---|
| 8,360,523 B2 * | 1/2013 | Maierhofer | ............ | A47C 7/465 |
| | | | | 297/284.4 |
| 2002/0140124 A1 | 10/2002 | Rutsch | | |
| 2007/0236063 A1 * | 10/2007 | Blendea | ................. | A47C 7/465 |
| | | | | 297/284.4 |
| 2008/0264425 A1 * | 10/2008 | Mundell | ................ | A47C 7/465 |
| | | | | 128/845 |
| 2011/0062757 A1 * | 3/2011 | Colja | ....................... | B60N 2/66 |
| | | | | 297/284.3 |
| 2011/0115268 A1 * | 5/2011 | Maierhofer | ............ | A47C 7/465 |
| | | | | 297/284.4 |
| 2013/0341982 A1 * | 12/2013 | Maierhofer | ............ | A47C 7/465 |
| | | | | 297/284.4 |

FOREIGN PATENT DOCUMENTS

| | | |
|---|---|---|
| CN | 202557364 | 11/2012 |
| CN | 204279161 | 4/2015 |
| EP | 2281715 | 2/2011 |
| KR | 20110140037 | 12/2011 |
| WO | 2011057694 | 5/2011 |
| WO | 2011162452 | 12/2011 |

OTHER PUBLICATIONS

Search Report from the State Intellectual Property Office of China for Application No. 201510216931X dated Nov. 21, 2016 (2 pages).

* cited by examiner

METHOD OF PRODUCING A LUMBAR SUPPORT DEVICE, LUMBAR SUPPORT DEVICE AND VEHICLE SEAT

TECHNICAL FIELD

Embodiments of the invention relate to lumbar support devices and method of producing the same. Embodiments of the invention relate to in particular to lumbar support devices which comprise arching elements which in operation contact a support basket.

BACKGROUND

Lumbar support devices are frequently provided in seat backrests in order to provide adequate support in the lumbar vertebral or lordosis region of a person sitting on the seat by forming a suitable support surface. The lumbar support device may have a support basket or other support member that is attached to a frame arranged in the seat backrest. An adjusting device may optionally be provided to adjust the curvature or convexity of the support basket and/or to adjust the position of the support basket along the longitudinal, i.e. height, direction of the backrest.

Lumbar support devices which comprise arching elements arranged at a rear side of the support basket are attractive for various reasons, including comfort, and may be used in a wide variety of different seats including vehicle seats.

The production of a lumbar support device which comprises arching elements supporting a support basket from a rear side may be a fairly complex process. For illustration, mounts for mounting the arching elements may be fabricated in conventional methods and the arching elements are subsequently attached to a carrier of the lumbar support device using the mounts. The carrier may comprise two lateral side wires and may be configured as a wire which generally has a U-shape. Overmolded portions may need to be formed on the carrier for mounting the carrier to a frame of a backrest. The support basket may be pre-fabricated using injection molding. In conventional techniques, the arching elements and support basket are subsequently assembled to the carrier. All of these steps add to the complexity of the manufacturing process, to the time required to produce a lumbar support device, and to the costs of the lumbar support device.

SUMMARY

There is a need in the art for improved lumbar support devices and method of producing the same. In particular, there is a need in the art for lumbar support devices which can be produced more efficiently than conventional lumbar support devices. There is also a need for methods and apparatuses for producing the lumbar support device.

According to embodiments of the invention, a lumbar support device which comprises arching elements and a support basket has a configuration which allows several molding processes to be performed using the same molding tool. An injection molding process which forms the support basket and an injection molding process which molds the arching elements to a carrier, e.g. a wire of the lumbar support device, may be performed using the same molding tool. The injection molding processes may be combined as a one-shot overmolding.

The molding tool may comprise a first half mold and a second half mold which in combination define cavities for forming the support basket and for forming overmolds which mold the arching elements to the carrier. Additional molding processes may be performed in the same molding tool. Overmolded portions for attaching the carrier to a frame of a seat backrest may be formed on the carrier in the molding tool. Alternatively or additionally, a bridge which is displaceable along the carrier may be formed in the molding tool.

A method of producing a lumbar support device according to an embodiment comprises molding a pair of arching elements to a carrier of the lumbar support device by injection molding in a molding tool. A support basket may be formed by injection molding in the same molding tool. I.e., one molding tool may be used both for forming the support basket and for molding the pair of arching elements to the carrier.

The carrier may be a metal carrier. The carrier may be a metal wire or may comprise several metal wires which define spaced lateral sides of the lumbar support device.

The pair of arching elements may be molded to the carrier such that the arching elements extend along the spaced lateral sides.

Each arching element of the pair of arching elements may be a metal strip. The arching elements may be flat at the time at which they are molded to the carrier and may be deformed into an arched configuration after removal from the molding tool.

The method may comprise forming a bridge which extends between the pair of spaced lateral sides and which is displaceable along the pair of spaced lateral sides. The bridge may be formed by injection molding in the molding tool. The bridge allows the lumbar support provided by the lumbar support device to be adjusted by displacement of the bridge along the pair of spaced lateral sides.

The bridge may comprise a recess for respectively supporting an end of each arching element of the pair of arching elements, which is not molded to the carrier. The recess may have pivot coupling portions for pivotably attaching the ends of the arching elements thereto.

The bridge may comprise slots extending parallel to the spaced lateral sides of the carrier.

The bridge may have a mounting section for mounting a motor thereto. The bridge may be configured to supporting at least one of a spindle or a spindle nut of a spindle drive thereon.

The support basket may be pivotably molded to the carrier in the molding tool. The carrier may have transverse sections extending transverse to the spaced lateral sides, with the support basket being molded to the transverse sections.

The support basket may be formed in the molding tool to have at least one pivot portion molded to the carrier to allow the support basket to pivot relative to the carrier.

The support basket may be formed in the molding tool to have at least two pivot portions coupled to the carrier. The at least two pivot portions may define coaxial passages through which the carrier extends.

The method may comprise pivoting the support basket relative to the carrier after removal from the molding tool to bring the support basket into contact with the pair of arching elements.

Overmolded portions may be formed on the carrier by injection molding in the molding tool in which the pair of arching elements is molded to the carrier. At least some of the overmolded portions may be attachment features for attaching the lumbar support device to a seat frame. At least two attachment features may be formed at an upper end of the carrier, and at least one attachment feature may be formed at a lower end of the carrier.

The molding tool may comprise at least one insert for forming the overmolded portions. The at least one insert may be replaceable in the molding tool. This allows the molding tool to be easily adjusted to different attachment configurations in different seats.

The various molding processes which are performed using the molding tool may be performed concurrently. For illustration, the support basket may be formed concurrently with molding the pair of arching elements to the carrier. Other molding processes may be performed concurrently. The bridge may be formed concurrently with the support basket and/or concurrently with molding the pair of arching elements to the carrier. The overmolded portions may be formed concurrently with the support basket and/or concurrently with molding the pair of arching elements to the carrier.

A lumbar support device according to an embodiment comprises a carrier, a pair of arching elements molded to the carrier, and a support basket supported by the pair of arching elements.

The lumbar support device may be formed in an efficient process. For illustration, molding the arching elements to the carrier and forming the support basket may be performed using the same molding tool.

The support basket may be pivotably molded to the carrier.

The lumbar support device may comprise a bridge molded to the carrier and displaceable along a pair of spaced lateral sides of the carrier.

The lumbar support device may comprise a motor mounted to the bridge to drive the bridge along the pair of spaced lateral sides.

The lumbar support device may be formed using the method according to an embodiment.

A vehicle seat according to an embodiment comprises a seat back having a frame and the lumber support device according to an embodiment.

An apparatus for producing a lumbar support device according to an embodiment comprises a molding tool comprising a first half mold and a second mold which define recesses for molding arching elements to a carrier of the lumbar support device and for forming a lumbar support basket.

The molding tool may define at least one other recess for forming a bridge which extends between lateral sides of the carrier. The at least one other recess for forming the bridge may be shaped such that the bridge is displaceable along the lateral sides of the carrier.

The molding tool may define further recesses for forming overmolded portions on the carrier. The further recesses may be provided in inserts of the first half mold or of the second half mold.

In embodiments, forming the lumbar support basket and other overmolding processes may be performed using the same molding tool. Different plastic materials may be used to form the lumbar support basket, to mold the arching elements to the carrier or to form the bridge, for example.

At least the overmolded portions for attachment of the lumbar support device to a backrest may be formed using a cold runner.

The methods, devices and apparatuses according to various embodiments may be utilized for providing lumbar support in seats. In particular, the devices and methods according to the various embodiments may be utilized for providing a lumbar support device in a seat backrest of a vehicle seat, in particular an automotive vehicle seat.

BRIEF DESCRIPTION OF THE DRAWINGS

Additional features and advantages of the invention will become more readily appreciated from the following detailed description of preferred or advantageous embodiments with reference to the accompanying drawings, wherein.

DETAILED DESCRIPTION OF EMBODIMENTS

Exemplary embodiments of the invention will now be described with reference to the drawings. While some embodiments will be described in the context of specific fields of application, such as in the context of automotive vehicle seating, the embodiments are not limited to this field of application. Further, the features of the various embodiments may be combined with each other unless specifically noted otherwise. In the description of embodiments, terms such as "upper", "lower", and "lateral" refer to directions when the lumbar support device is installed in a seat.

Figure 1:
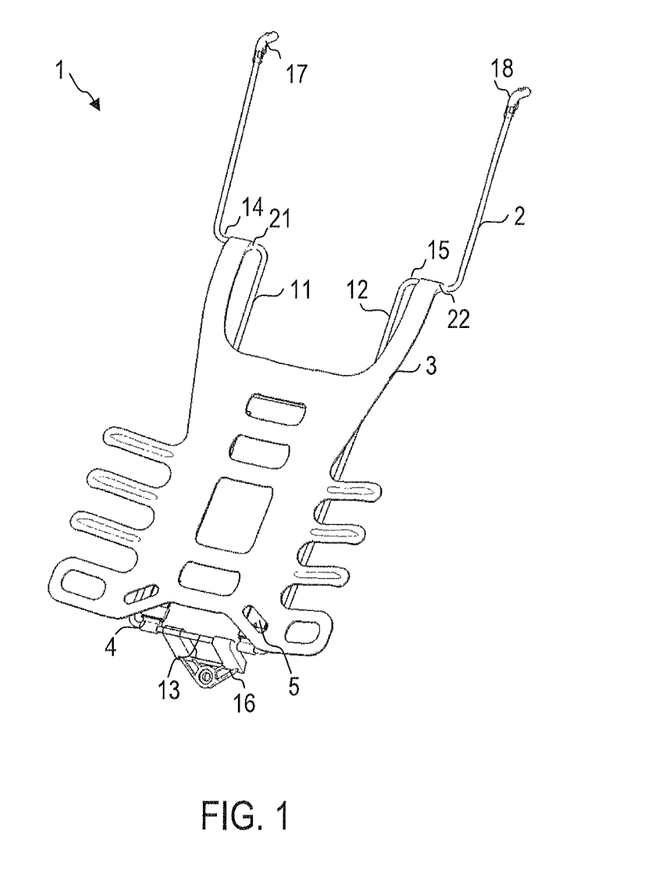
FIG. 1 is a perspective view of a lumbar support device according to an embodiment.
Figure 2:
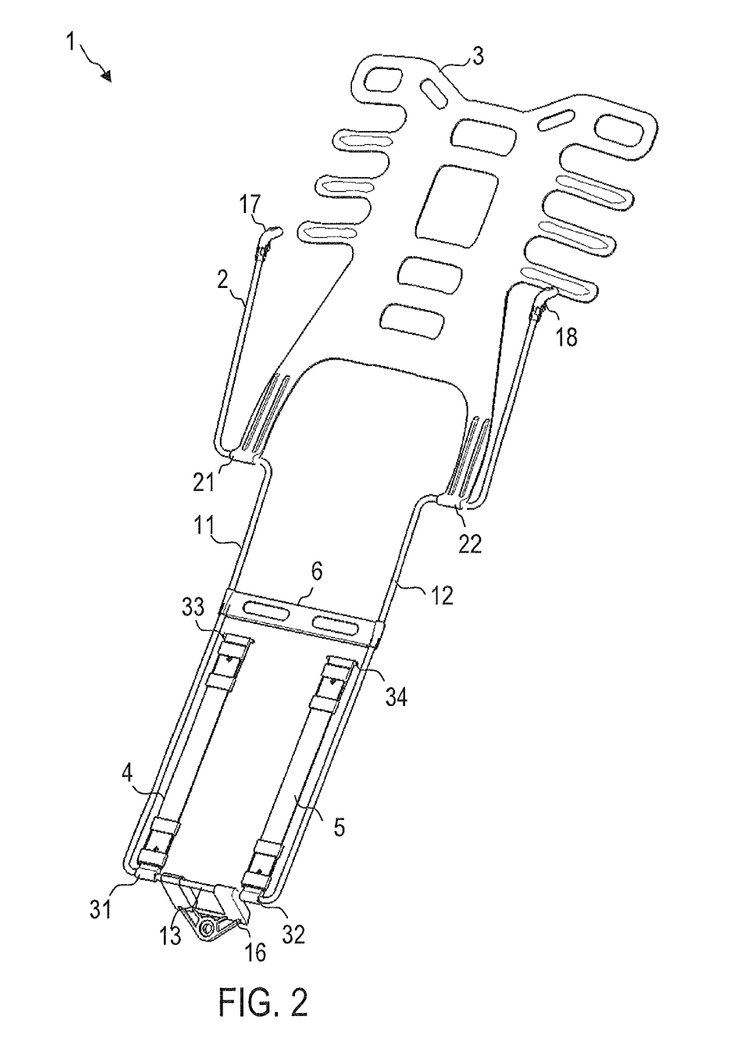
FIG. 2 is a perspective view of the lumbar support device of FIG. 1 with a support basket rotated.
Figure 3:
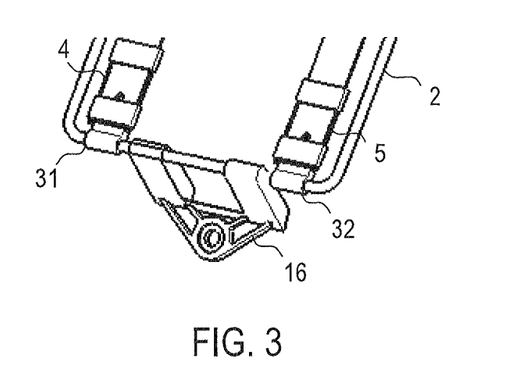
FIG. 3 is a detail view of the lumbar support device of FIG. 1.

FIG. 1 is a perspective view of the lumbar support device 1 according to an embodiment. FIG. 2 is another perspective view of the lumbar support device 1 with a lumbar support basket rotated relative to a carrier. FIG. 3 is a partial enlarged perspective view of the lumbar support device 1.

The lumbar support device 1 comprises a carrier 2, a support basket 3 and a pair of arching elements 4, 5. The pair of arching elements 4, 5 provides resilient support for the support basket 3 from a rear side of the support basket 3.

The carrier 2 defines lateral sides 11, 12 of the lumbar support device 1. The carrier 2 may be a metal carrier. The carrier 2 may be a metal wire having a generally U-shaped configuration, with a lower transverse side 13 extending between the lateral sides 11, 12.

The support basket 3 may be formed from a plastic material. The support basket 3 may be formed in a molding tool in which one or more other overmoldings for the lumbar support device 1 are formed by injection molding, as will be explained in more detail below. For illustration, one injection tool may be used to concurrently form the support basket 3 and to mold the arching elements 4, 5 to the carrier 2.

The arching elements 4, 5 may respectively be metal strips. The arching elements 4, 5 may extend along the lateral sides 11, 12 of the carrier 2. The arching elements 4, 5 may be molded to the carrier 2. An overmolding 31 may be molded onto an end of the arching element 4 and the carrier 2. The overmolding 31 may be pivotable about the lower transverse side 13 of the carrier 2. The lower transverse side 13 may extend through the overmolding 31 to allow the overmolding 31 and the end of the arching element 4 to pivot about the lower transverse side 13 of the carrier 2. The overmolding 31 may at least partially surround the arching element 4 to secure the arching element 4 to the lower transverse side 13. An overmolding 32 may be molded onto a lower end of the arching element 5 and the carrier 2. The overmolding 32 may be pivotable about the lower transverse side 13 of the carrier 2. The lower transverse side 13 may extend through the overmolding 32 to allow the overmolding 32 and the end of the arching element 5 to pivot about the lower transverse side 13 of the carrier 2. The overmolding 32 may at least partially surround the arching element 5 to secure the arching element 5 to the lower transverse side 13.

The support basket 3 may be formed from a plastic material which may be the same plastic material as the one of the overmoldings 31, 32. The support basket 3 may be formed by injection molding, as will be explained in more detail below. The support basket 3 may be directly molded to the carrier 2. The carrier 2 may have transverse sections 14, 15 to which the support basket 3 may be molded. The support basket 3 may be formed to have pivot portions 21, 22, with the pivot portion 21 circumferentially extending about the transverse section 14 and the pivot portion 22 circumferentially extending about the transverse section 15. In the molding tool in which the support basket 3 is formed, the support basket 3 be formed at a location which is different from the location of the support basket 3 in the fully assembled lumbar support device 1. In particular, similarly to what is shown in FIG. 2, the support basket 3 may be formed in the molding tool such that it extends from the transverse sections 14, 15 to a direction opposite to the direction in which the arching elements 4, 5 are located. The support basket 3 may be pivoted about the transverse sections 14, 15 after the lumbar support device 1 has been removed from the molding tool to bring the support basket 3 into contact with the arching elements 4, 5.

Overmolded portions 16-18 may be overmolded onto the carrier 2. The overmolded portions 16-18 may be overmolded onto the carrier 2 in the same molding tool in which the support basket 3 is formed. The overmolded portions 16-18 and the support basket 3 may be formed concurrently using the same molding tool.

At least some of the overmolded portions 16-18 can be formed as attachment features for attaching the lumbar support device 1 to a frame of a backrest. Overmolded portion 16 may be shaped for attachment of a lower end of the lumbar support device 2. For illustration, the overmolded portion 16 may have an opening which allows a bolt or threaded shaft to extend therethrough for attachment to a frame of a backrest. Overmolded portions 17, 18 may be provided at an upper end of the carrier 2. The overmolded portions 17, 18 may have a hook-shape configuration for hooking engagement with the frame of the backrest.

A cross member 6 may be attached to the lateral sides 11, 12 of the carrier 2. The cross member 6 may be formed from a plastic material. The cross member 6 may be formed in the same molding tool in which the support basket 3 and/or overmolded portions 16-18 are formed. The cross member 6 may be fixedly attached to the lateral sides 11, 12. Alternatively or additionally to a stationary cross member 6, a bridge which is displaceable along the lateral sides 11, 12 of the carrier 2 may be formed in the molding tool, as will be explained in more detail with reference to FIG. 8 to FIG. 15. The cross member 6 may be directly molded to the carrier 2 in the molding tool. The cross member 6 may also be formed separately from the carrier 2 and may be attached to the carrier 2 after the carrier with the arching elements 4, 5 molded thereto has been removed from the molding tool.

The cross member 6 may have a recess for receiving components of an actuator. The cross member 6 may have a recess for receiving a motor, or a reduction gearing, and/or of a spindle drive. For illustration, a spindle nut of a spindle drive may be attached to the cross member 6. The spindle nut may be rotatably driven to displace a bridge along the lateral sides 11, 12, as will be explained in more detail with reference to FIG. 8 to FIG. 15. The cross member 6 may serve as a housing shell for the actuator. A further housing shell may be attached to the cross member 6 to form a housing for the motor, the reduction gearing and the spindle nut of the spindle drive, for example.

Overmoldings 33, 34 may be formed on upper ends of the arching elements 4, 5. The overmoldings 33, 34 may be configured for attaching the upper ends of the arching elements 4, 5 to the cross member 6 and/or to the support basket 3. The overmoldings 33, 34 may be configured to pivotably attach the upper ends of the arching elements 4, 5 to a displaceable bridge. The arch formed by the arching elements 4, 5 and thereby the degree of lateral support provided by the lumbar support device 1 may be adjusted by displacing a moveable bridge along the lateral sides 11, 12. The overmoldings 33, 34 may be formed in the same molding tool in which the support basket 3 is formed.

In order to form the lumbar support device 1, the carrier 2 and the arching elements 4, 5 may be inserted into the molding tool. The molding tool has recesses for both receiving the carrier 2 and the arching elements 4, 5. The support basket 3 may be formed by cold runner or hot runner injection molding. Concurrently thereto, the overmoldings 31, 32 and, if present, the overmoldings 33, 34 may be formed to mold the arching elements 4, 5 to the carrier 2. The overmolded portions 16-18 and/or the cross member 6 may also be formed using the same molding tool. The various plastic components may be formed by cold runner injection molding.

When inserted into the molding tool, the arching elements 4, 5 do not need to have their arched configuration. For illustration, the arching elements 4, 5 may be substantially flat during the overmolding process and may be bent after the carrier 2 with the arching elements 4, 5 molded thereto has been removed from the molding tool.

The support basket 3 may be formed at a location in the molding tool which does not correspond to its arrangement in the assembled lumbar support device 1. For illustration, the support basket 3 may be formed at a location which is offset from the location at which the support basket 3 is positioned during use. The support basket 3 may be formed in the molding tool at a location which is generally similar to the one illustrated in FIG. 2. By pivoting the support basket 3 about the transverse sections 14, 15 of the carrier 2, the support basket 3 may be brought into contact with the arching elements 4, 5. The overmoldings 33, 34 of the arching elements 4, 5 may be engaged with the cross member 6 after the carrier 2 with the arching elements 4, 5 molded thereto has been removed from the molding tool, which bends the arching elements 4, 5 into an arched configuration.

Figure 4:
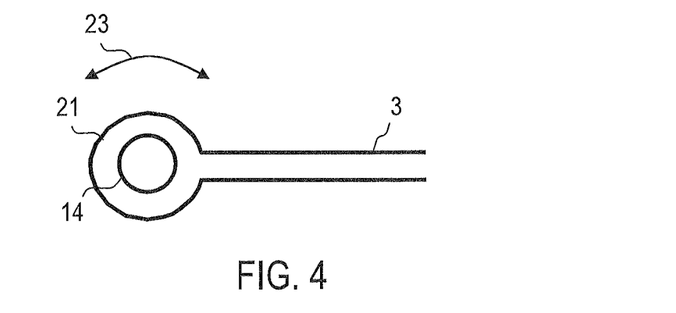
FIG. 4 is a partial cross-sectional view of the lumbar support device of FIG. 1.

FIG. 4 is a cross-sectional view through the lumbar support device 2 at the pivot portion 21. The support basket 3 may be formed to have the pivot portion 21 which fully or partially surrounds the transverse section 14 of the carrier 2. The further pivot portion 22 may have the same configuration as the pivot portion 21. As shown in FIG. 4, the pivot portion 21 is configured to allow the support basket 3 to pivot relative to the carrier 2. This allows the support basket 3 to be formed such that it is molded to the carrier 2 at the pivot portion 21 and the further pivot portion 22. The support basket 3 can undergo a pivoting movement 23 to bring the support basket 3 into contact with the arching elements 4, 5 after removing the lumbar support device 1 from the molding tool.

Figure 5:
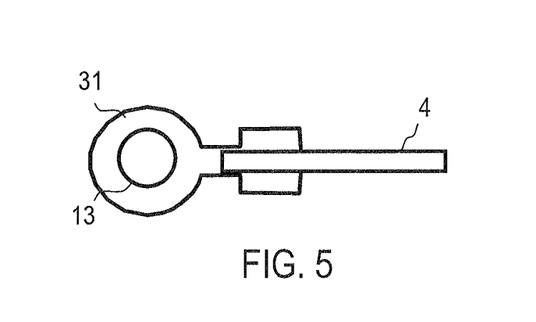
FIG. 5 is another partial cross-sectional view of the lumbar support device of FIG. 1.

FIG. 5 is a cross-sectional view through the lumbar support device 2 at the overmolding 31. The overmolding 31 may extend along both the arching element 4 and the lower transverse side 13 of the carrier 2. The overmolding 31 may securely attach the arching element 4 to the carrier 2. The overmolding 31 may extend circumferentially about the lower transverse side 13 of the carrier 2. The overmolding 31 may be pivotable about the lower transverse side 13 of the carrier 2, e.g. when the arching element 4 is bent.

In a method of producing the lumbar support device 1 according to an embodiment, several of the components which are formed of plastic may be formed using the same molding tool. For illustration, the support basket 3 may be formed by injection molding in the same molding tool in which the overmolded portions 16-18 are formed and/or in which the arching elements 4, 5 are molded to the carrier 2 by overmoldings 31, 32.

Figure 6:
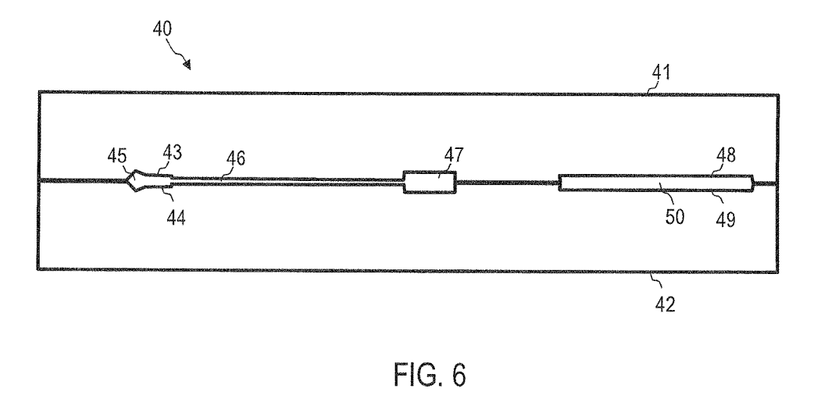
FIG. 6 is a cross-sectional view of a molding tool used in a method according to an embodiment.

FIG. 6 is a schematic cross-sectional view through a molding tool 40 according to an embodiment. The molding tool 40 comprises a first half mold 41 and a second half mold 42. The first half mold 41 and the second half mold 42 may define a recess 43, 44 for receiving the carrier 2. The carrier 2 may be a metal wire bent to have generally a U-shape, as schematically illustrated in FIG. 1 and FIG. 2. The first half mold 41 and the second half mold 42 may form recesses for receiving the arching elements 4, 5. When inserted into the molding tool 40, the arching elements 4, 5 may have a flat configuration. The arching elements 4, 5 may be bent to form an arch after removal from the molding tool 40.

The first half mold 41 and the second half mold 42 may define a cavity 45 for molding the arching element 4 to the carrier 2. Both the lower side 13 of the carrier 2 and the arching element 4 may extend into the cavity to mold the arching element 4 to the carrier 2 by injection molding, thereby forming the overmolding 31. The first half mold 41 and the second half mold 42 in combination may define another cavity for molding the arching element 5 to the carrier 2. Both the lower side 13 of the carrier 2 and the arching element 5 may extend into the other cavity to mold the arching element 5 to the carrier 2 by injection molding, thereby forming the overmolding 32.

The first half mold 41 and the second half mold 42 in combination may define a cavity 50 for forming the support basket 3 by injection molding. The cavity 50 may have several extensions to form the fingers of the support basket 3 which project in a lateral direction. The first half mold 41 and the second half mold may have recesses 48, 49 which define the cavity 50.

The first half mold 41 and the second half mold 42 may define additionally cavities for forming the cross member 6 and/or the overmolded portions 16-18 which serve as attachment features of the lumbar support device 2. A cavity 47 may be provided in the molding tool 40 to form the cross member 6 molded to the lateral sides 11, 12 of the carrier 2.

Figure 7:
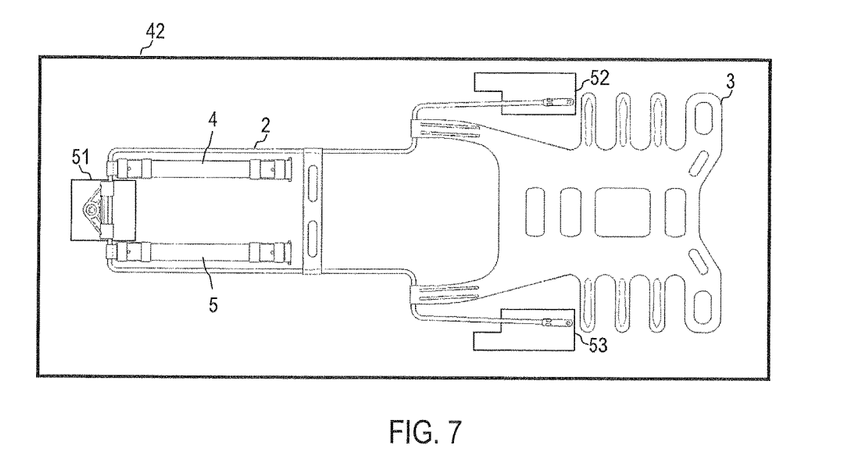
FIG. 7 is a plan view of a half mold of the molding tool used in a method according to an embodiment.

FIG. 7 is a plan view of a half mold 42 after the injection molding has been completed. The half mold 42 may have inserts 51-53 for forming the overmolded portions 16-18. The inserts 51-53 may be replaceable.

Cold runner injection molding may be used for all or some of the injection molding processes which are performed using the molding tool 40. For illustration, the overmolded portions 16-18 may be formed using a cold runner.

After the injection molding processes have been completed, the lumbar support device 2 may be removed from the molding tool 40. The upper ends of the arching elements 4, 5 may be attached to the cross member 6. Components of an actuator may be mounted to the cross member 6. For illustration, a motor, a reduction gearing and/or a spindle nut of a spindle drive may be attached to the cross member 6. The lumbar support basket 3 may be brought into contact with the arching elements 4, 5, e.g. by pivoting the lumbar support basket 3 relative to the carrier 2.

Various modifications or alterations may be used in lumbar support devices according to further embodiment. For illustration, the lumbar support device 1 may comprise a bridge 7 which is displaceable along the lateral sides 11, 12. The bridge 7 may be formed in the same molding tool 40. The bridge 7 may be directly molded onto the lateral sides 11, 12 so as to be displaceable along the lateral sides 11, 12. The molding tool 40 may have a recess for forming the bridge 7 by injection molding.

Figure 8:
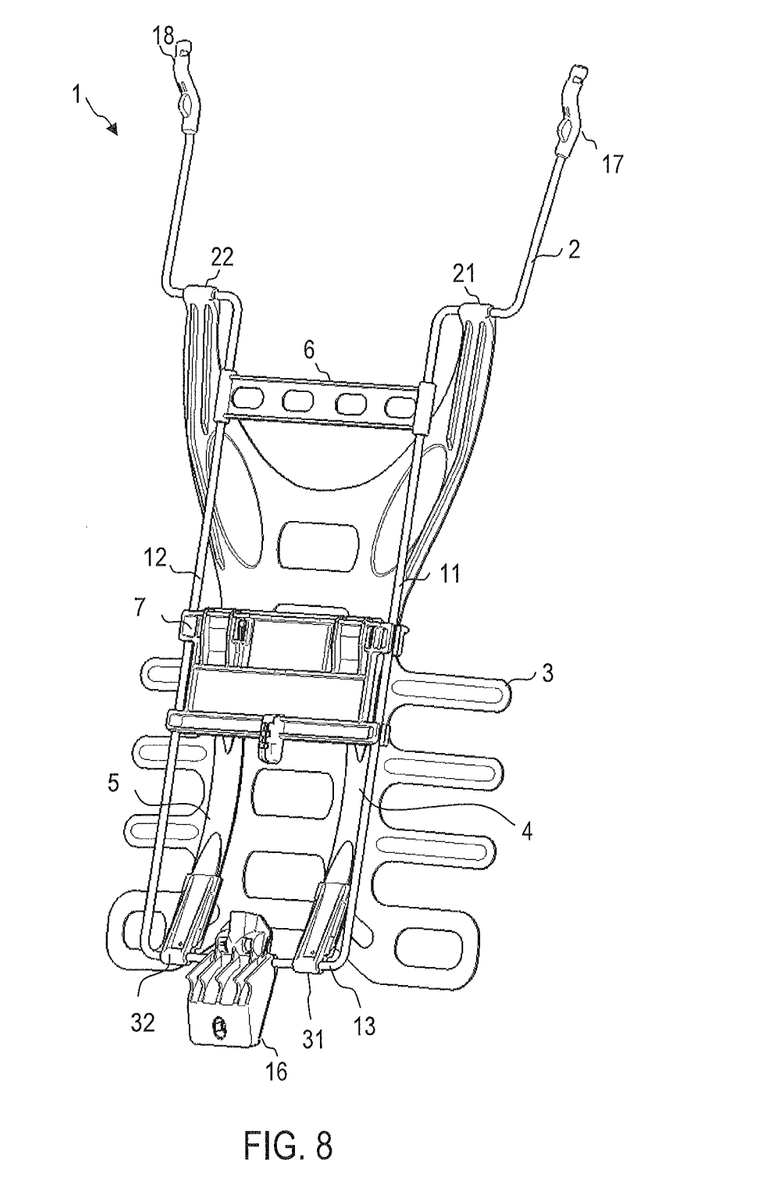
FIG. 8 is a perspective rear view of a lumbar support device according to an embodiment.
Figure 9:
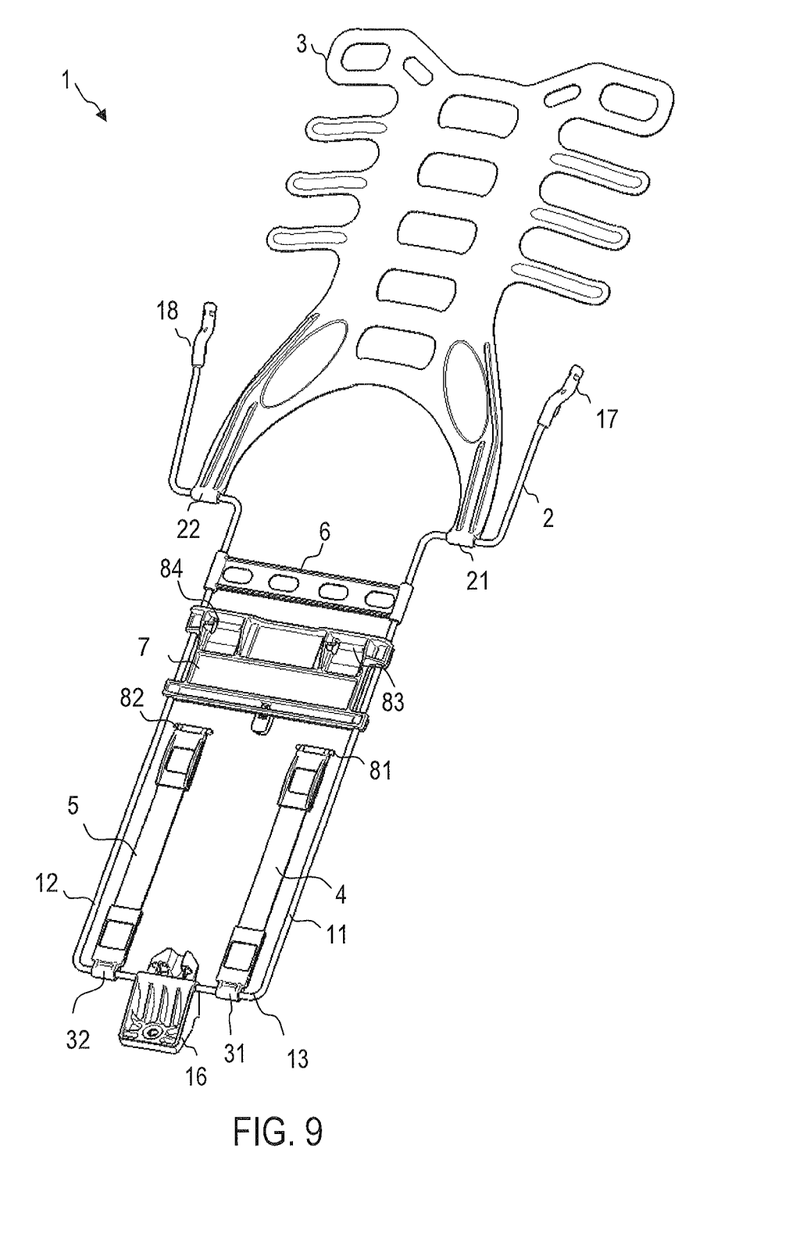
FIG. 9 is a perspective rear view of the lumbar support device of FIG. 8 as formed in the molding tool.
Figure 10:
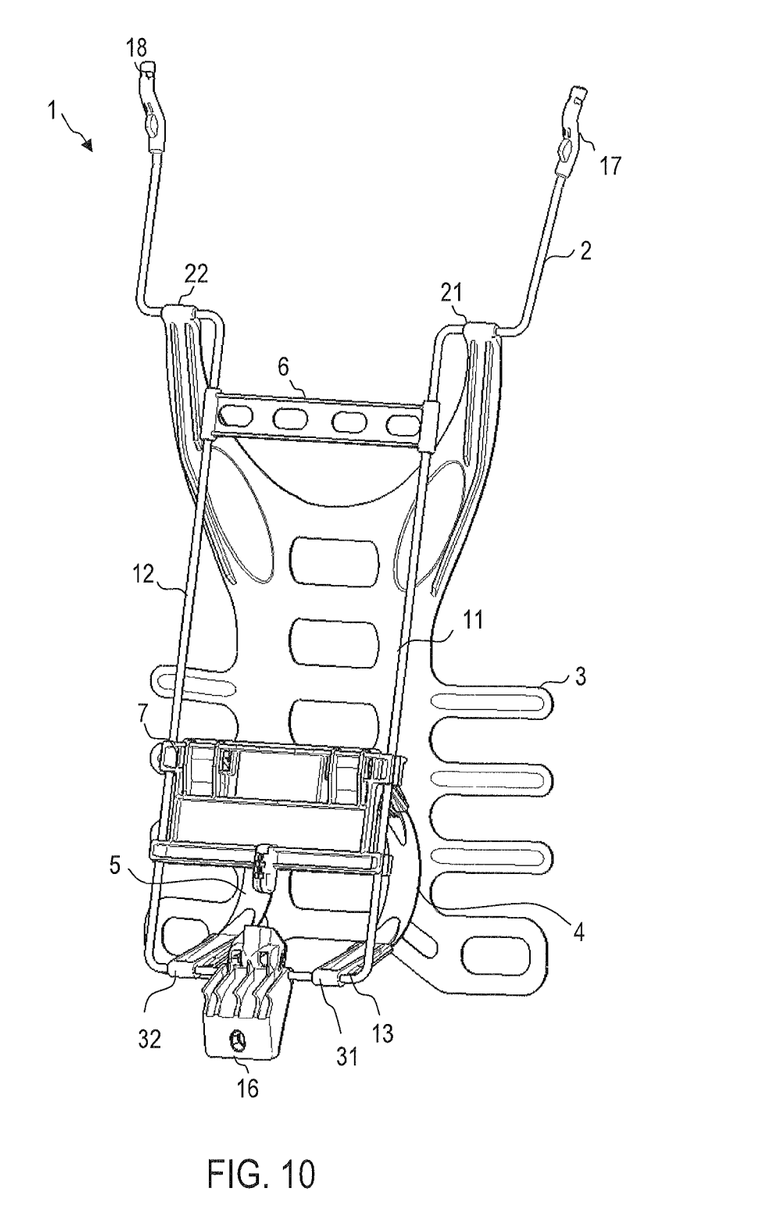
FIG. 10 is a perspective rear view of the lumbar support device of FIG. 8 when an adjusting device is actuated.

FIG. 8 is a rear perspective view of a lumbar support device 1 according to an embodiment, which comprises the bridge 7 which is displaceable along the lateral sides 11, 12. FIG. 9 is a rear perspective view of the lumbar support device 1 of FIG. 8 as it may be formed in the molding tool. FIG. 10 is a rear perspective view of the lumbar support device 1 of FIG. 8 when the bridge 7 is displaced along the lateral sides 11, 12.

The lumbar support device 1 of FIG. 8 to FIG. 10 comprises a bridge 7 in addition to the cross member 6. The bridge 7 is displaceable along the lateral sides 11, 12. The bridge 7 may be directly molded to the lateral sides 11, 12 in the molding tool 40.

As best seen in FIG. 9, an end of the arching element 4 may be overmolded with an engagement portion 81. The bridge 7 may be formed to have a mating recess 83 for receiving the engagement portion 81. The bridge 7 may be formed to pivotably support the arching element 4 at its engagement portion 81.

An end of the arching element 5 may be overmolded with an engagement portion 82. The bridge 7 may be formed to have a mating recess 84 for receiving the engagement portion 82. The bridge 7 may be formed to pivotably support the arching element 5 at its engagement portion 82.

The recesses 83, 84 of the bridge 7 in which ends of the arching elements 4, 5 are pivotably received are offset from each other in a direction transverse to the lateral sides 11, 12.

The lumbar support device 1 may further comprise an adjusting mechanism for displacing the bridge 7 along the lateral sides 11, 12. The adjusting mechanism may comprise an actuator. The actuator may be a power drive comprising an electric motor. The actuator may be a manual actuator. At least a portion of the adjusting mechanism may be supported on or otherwise coupled to the bridge 7, as will be explained in more detail with reference to FIG. 11 and FIG. 15.

For illustration, the bridge 7 may have a recess for receiving components of the actuator. The bridge 7 may have a recess for receiving a motor, or a reduction gearing, and/or of a spindle drive. A spindle nut of a spindle drive may be rotatably supported on the bridge 7. The spindle nut may be rotatably driven to displace the bridge 7 along the lateral sides 11, 12. The bridge 7 may serve as a housing shell for the actuator. A further housing shell may be attached to the bridge 7 to form a housing for the motor, the reduction gearing and the spindle nut of the spindle drive, for example.

FIG. 9 illustrates a configuration of the lumbar support device 1 as it may be formed in the molding tool. The support basket 3 may be rotated relative to its operational position. The bridge 7 may be spaced from the upper ends of the arching elements 4, 5 to allow the engagement portions 81, 82 to be overmolded onto the arching elements 4, 5.

When the lumbar support device 1 is removed from the molding tool, the method of producing the lumbar support device 1 may comprise engaging the arching elements 4, 5 with the displaceable bridge 7. The engagement portions 81, 82 may be attached to the bridge 7 in a snap fit connection, for example. The method may comprise rotating the support basket 3 to bring the support basket 3 into abutment with the arching elements 4, 5.

Figure 11:
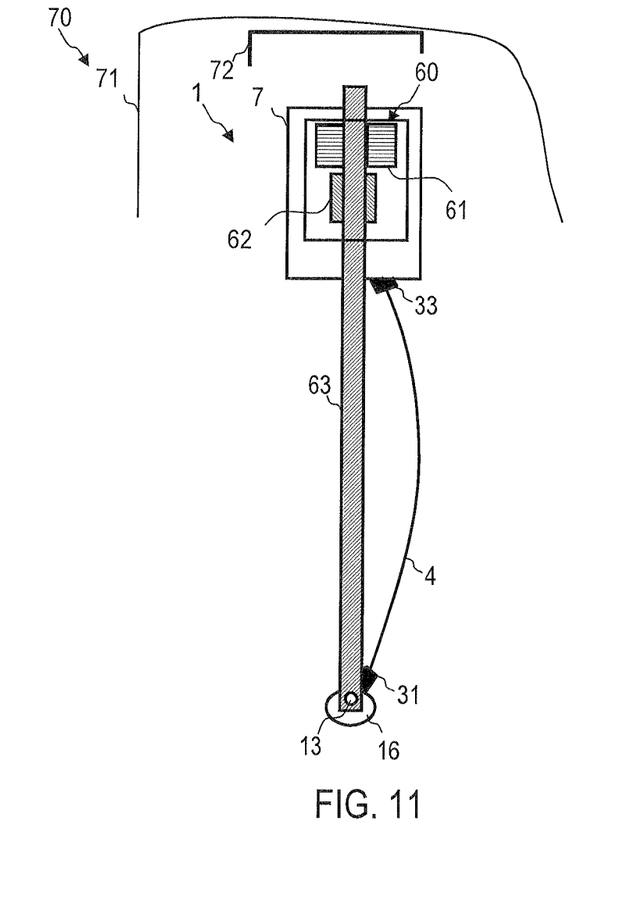
FIG. 11 is a cross-sectional view of a vehicle seat having the lumbar support device according to an embodiment.

FIG. 11 is a cross-sectional side view of the lumbar support device 1 according to an embodiment, taken along a spindle 63 of a spindle drive. The bridge 7 is displaceable along the lateral sides 11, 12 by actuation of the spindle drive, thereby changing the curvature of the arching elements 4, 5. The lumbar support device may be installed in a vehicle seat 70. The carrier 2 may be attached to a frame 72 of a backrest 71 at the overmolded attachment features 16-18.

An actuator 60 may be mounted to the bridge 7. The actuator 60 may comprise a motor 61 and a spindle nut 62 threadingly engaged with a spindle 63. The spindle 63 may be mounted to the carrier 2 so as to be rotationally fixed. Rotation of the spindle nut 62 under action of the motor 61 causes the bridge 7 to be displaced along the lateral sides 11, 12, thereby changing the curvature of the arching elements 4, 5. A speed reduction gearing (not shown in FIG. 11) may be mounted on the bridge 7 and may be coupled in between an output shaft of the motor 61 and the spindle nut 62. In order to facilitate movement of the bridge 7 along the sides 11, 12 of the carrier 2, the bridge 7 may be formed with slots which extend in proximity to the lateral sides 11, 12 of the carrier 2, as illustrated in FIG. 12.

Figure 12:
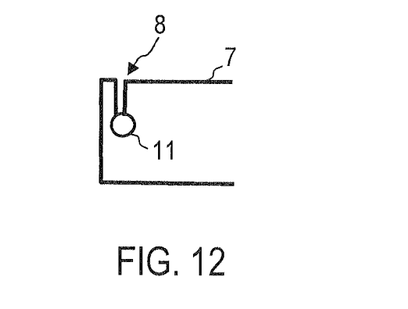
FIG. 12 is a partial cross-sectional view of the lumbar support device according to an embodiment.

FIG. 12 is an enlarged partial cross-sectional view of the bridge 7 attached to the carrier 2. The bridge 7 is formed with a slot 8 which extends to the lateral side 11 of the carrier 2 along which the bridge 7 is displaceable. Similarly, another slot may be formed at the other lateral side 12 of the carrier 2 to facilitate movement of the bridge 7 along the lateral sides 11, 12.

Figure 13:
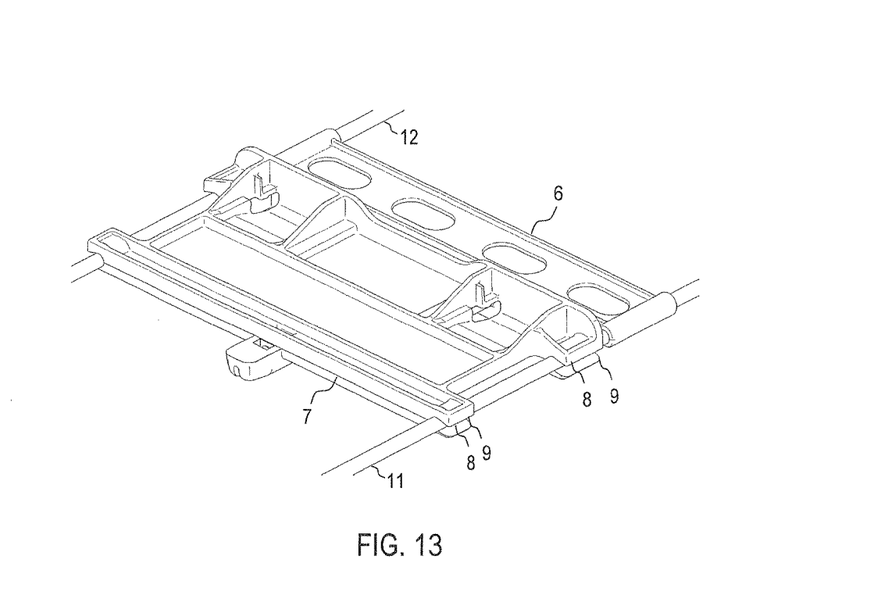
FIG. 13 is an enlarged partial view showing a bridge of a lumbar support device according to an embodiment.
Figure 14:
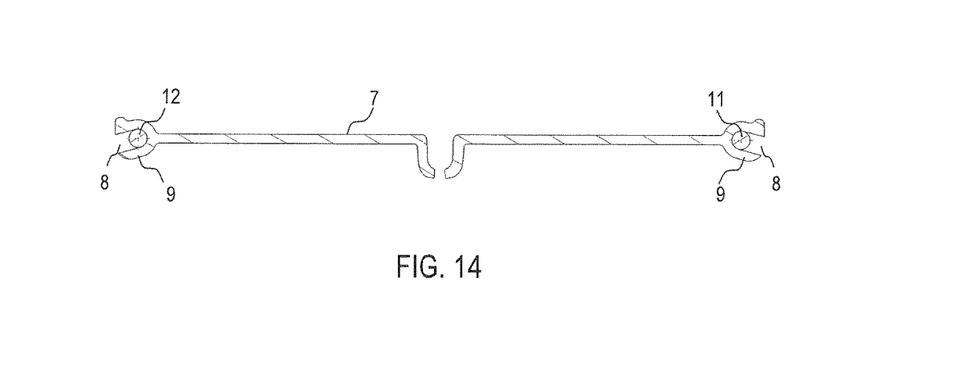
FIG. 14 is a cross-sectional view of the bridge of FIG. 13.

FIG. 13 is an enlarged perspective view showing the bridge 7 attached to the carrier 2 of a lumbar support device 1 according to an embodiment.

The bridge 7 may have a length measured along the sides 11, 12 of the carrier 2. In order to ensure that the bridge 7 is displaceable along the sides 11, 12 even when the bridge 7 is formed in the molding tool 40, the bridge 7 has attachment sections 9 which are attached to the sides 11, 12. Each attachment section 9 may have a length, measured along the sides 11, 12, which is less than the length of the bridge 7 measured along the sides 11, 12.

The bridge 7 may comprise at least two attachment sections 9 which are both coupled to a first side 11 of the carrier 2 and which are spaced from each other by a gap. The bridge 7 may comprise at least two further attachment sections 9 which are both coupled to a second side 12 of the carrier 2 and which are spaced from each other by a gap.

The bridge 7 may be formed in the molding tool 40 such that the attachment sections 9 are directly molded to the sides 11, 12 of the carrier 2.

An opening 8 may be formed in each attachment section 9. The opening 8 may generally extend towards a lateral side, as best seen in the cross-sectional view of FIG. 14. The openings 8 may be angled, i.e., the openings 8 may extend along a direction which is not parallel to the lower transverse part 13 of the carrier 2. The openings 8 may extend from the sides 11, 12 of the carrier 2 in a rearward direction to withstand misuse forces applied onto the lumbar support device 1 in use.

When forming the bridge 7 in the same molding tool 40 in which the support basket 3 is formed, shrinkage may cause the clamp-like attachment sections 9 to slightly shrink away from the sides 11, 12 of the carrier 2. This prevents a glue-like adhesion of the attachment sections 9 to the sides 11, 12 which would be negative for displacing the bridge 7 along the sides 11, 12.

The bridge 7 may be formed in the molding tool such that it is spaced from the cross member 6.

Figure 15:
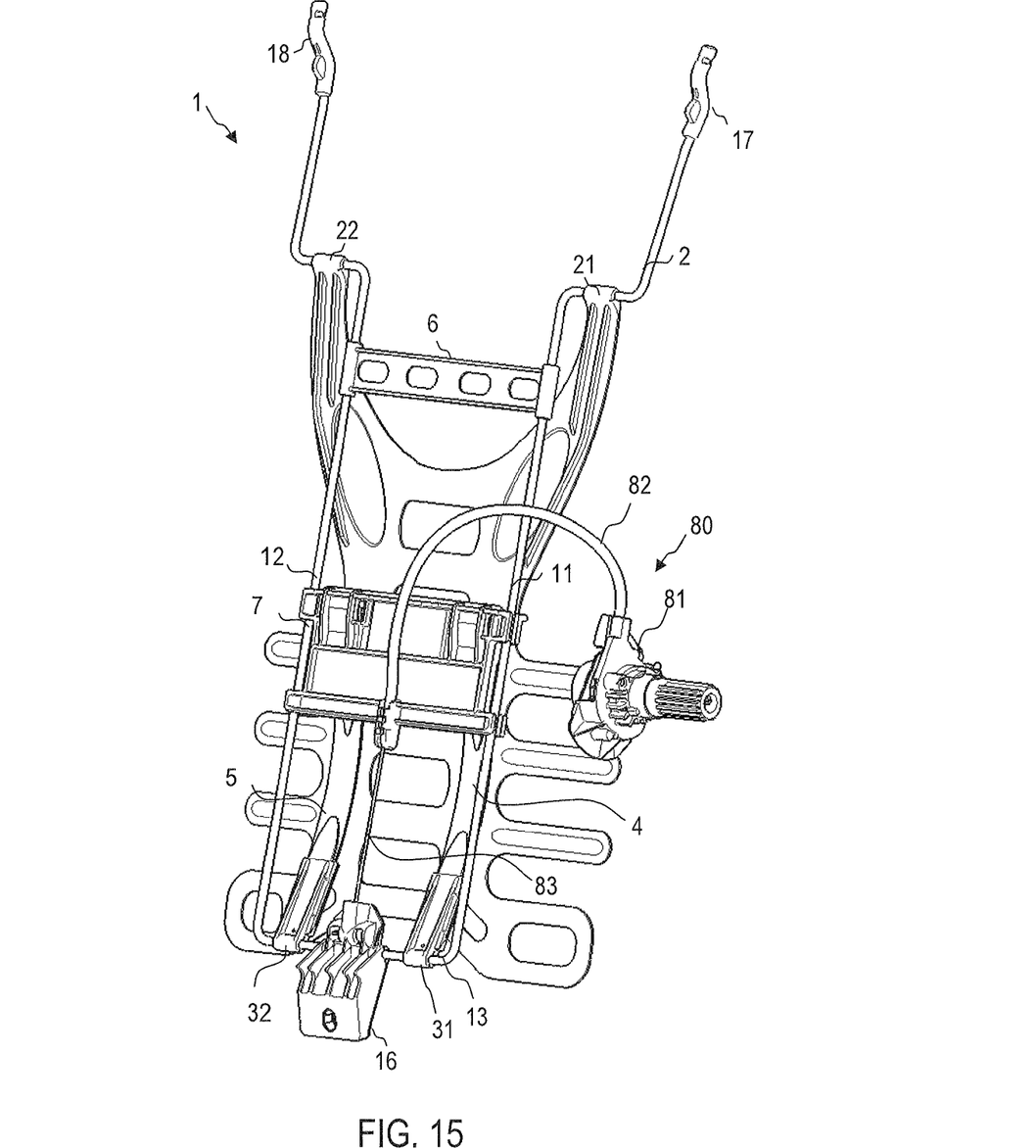
FIG. 15 is a perspective rear view of a lumbar support device according to an embodiment.

FIG. 15 is a rear perspective view of a lumbar support device 1 according to another embodiment. The lumbar support device 1 may be formed as explained with reference to FIG. 1 to FIG. 12 above. The lumbar support device 1 may comprise an adjusting mechanism 80. The adjusting mechanism 80 may comprise an actuator 81. The adjusting mechanism 80 may comprise a traction device connected to the actuator and the bridge 7 of the lumbar support device 1. The traction device may comprise a sleeve 82 and an inner member 83 slidably received in the sleeve 82. The traction device may be a Bowden cable, for example. The inner member 83 may be a wire or cable. The sleeve 82 may be a plastic sleeve.

An end of the inner member 83 may be attached to a pulley. An opposite end of the inner member 83 may be attached to the carrier 2, e.g. at the overmolded portion 16 which is molded to a lower transverse part 13 of the carrier 2. An end of the sleeve 83 may be supported on the actuator 81. An opposite end of the sleeve 83 may be attached to and supported on the bridge 7. By changing the traction applied by the traction device, the bridge 7 may be displaced along the lateral sides 11, 12.

Lumbar support devices having arching elements and a displaceable bridge allow the curvature of the arching elements to be adjusted. The apex and degree of support provided by the lumbar support device 1 may thereby be adjusted.

Embodiments of the invention allow a lumbar support device to be produced efficiently. Various plastic portions of the lumbar support device may be formed using the same molding tool. Some or all of the plastic portions may be formed concurrently, thereby reducing the production time per lumbar support device. For illustration, the support basket 3 may be produced in the same molding tool by injection molding in which the arching elements 4, 5 are molded to the carrier 2 and/or other overmolded portions 16-18 are molded onto the carrier 2. The cross member 6 and/or the bridge 7 may also be formed in the same molding tool or may be formed in a separate process.

Various modifications may be implemented in other embodiments. For illustration, the support basket 3 does not need to be directly molded onto the carrier 2 in the molding tool 40. The support basket 3 may be formed in the molding tool 40 such that it can be clipped onto the carrier 2 or may be otherwise attached to the carrier 2. For further illustration, the bridge 7 does not need to be directly molded onto the carrier 2 in the molding tool 40. The bridge 7 may be formed separately and may be attached to the carrier 2 after completion of the molding process.

Molding processes may be performed using cold runners or hot runners. The various plastic components which are formed by injection molding do not need to be formed from the same material. For illustration, the overmoldings 31-34 formed for attaching the arching elements 4, 5 to the carrier 2 or the bridge 7 and the support basket 3 may be formed from different materials.

Lumbar support devices according to embodiments may be used for providing adjustable lumbar support in seats. Exemplary fields of application include vehicle seats, such as automotive vehicle seats, without being limited thereto.

What is claimed is:

1. A method of producing a lumbar support device, the method comprising:
   molding a pair of arching elements to a carrier of the lumbar support device by injection molding in a molding tool, wherein an overmolding is molded onto an end of each of the pair of arching elements and onto the carrier; and
   forming a support basket by injection molding in the molding tool in which the pair of arching elements is molded to the carrier, wherein the support basket is formed in the molding tool to have at least one pivot portion molded to the carrier to allow the support basket to pivot relative to the carrier.

2. The method of claim 1,
   wherein the carrier forms a pair of spaced lateral sides of the lumbar support device, and
   wherein the pair of arching elements is molded to the carrier such that the arching elements extend along the spaced lateral sides.

3. The method of claim 2, further comprising:
   forming a bridge which extends between the pair of spaced lateral sides and which is displaceable along the pair of spaced lateral sides, said bridge being formed by injection molding in the molding tool.

4. The method of claim 1,
   wherein the support basket is formed in the molding tool to have at least two pivot portions coupled to the carrier, the at least two pivot portions defining coaxial passages through which the carrier extends.

5. The method of claim 1, further comprising:
   pivoting the support basket relative to the carrier after removal from the molding tool to bring the support basket into contact with the pair of arching elements.

6. The method of claim 1,
   wherein the support basket is formed concurrently with molding the pair of arching elements to the carrier.

7. The method of claim 1, further comprising:
   forming overmolded portions on the carrier by injection molding in the molding tool in which the pair of arching elements is molded to the carrier, wherein at least some of the overmolded portions are attachment features for attaching the lumbar support device to a seat frame.

8. The method of claim 7,
   wherein the molding tool comprises at least one replaceable insert for forming the overmolded portions.

9. A lumbar support device comprising:
   a carrier;
   a pair of arching elements molded to the carrier by an overmolding molded onto an end of each of the pair of arching elements and onto the carrier; and
   a support basket supported by the pair of arching elements, wherein the support basket is pivotably molded to the carrier by at least one pivot portion molded to the carrier.

10. The lumbar support device of claim 9, further comprising:
    a bridge molded to the carrier and displaceable along a pair of spaced lateral sides of the carrier.

11. The lumbar support device of claim 10 further comprising:
    an actuator coupled to the bridge to drive the bridge along the pair of spaced lateral sides.

12. The lumbar support device of claim 9,
    wherein the lumbar support device is produced by the method of claim 1.

13. A vehicle seat comprising:
    a seat back having a frame; and
    the lumber support device of claim 9 attached to the frame.

* * * * *